(12) United States Patent
Niell et al.

(10) Patent No.: US 9,075,952 B2
(45) Date of Patent: Jul. 7, 2015

(54) CONTROLLING BANDWIDTH ALLOCATIONS IN A SYSTEM ON A CHIP (SOC)

(71) Applicant: Intel Corporation, Santa Clara, CA (US)

(72) Inventors: Jose S. Niell, Franklin, MA (US); Ramadass Nagarajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 13/743,833

(22) Filed: Jan. 17, 2013

(65) Prior Publication Data
US 2014/0201500 A1   Jul. 17, 2014

(51) Int. Cl.
*G06F 15/78* (2006.01)

(52) U.S. Cl.
CPC .................................. *G06F 15/7807* (2013.01)

(58) Field of Classification Search
CPC ............................... G06F 13/00; G06F 5/7807
USPC .......................................................... 710/60
See application file for complete search history.

(56) References Cited

U.S. PATENT DOCUMENTS

| | | | |
|---|---|---|---|
| 6,052,744 A * | 4/2000 | Moriarty et al. | 710/27 |
| 6,470,238 B1 * | 10/2002 | Nizar et al. | 700/299 |
| 2003/0131200 A1 | 7/2003 | Berg et al. | |
| 2008/0172499 A1 | 7/2008 | Moriki et al. | |
| 2009/0119432 A1 * | 5/2009 | Lee et al. | 710/113 |
| 2009/0193164 A1 * | 7/2009 | Ajanovic et al. | 710/107 |
| 2009/0249046 A1 | 10/2009 | Berg et al. | |
| 2010/0153658 A1 * | 6/2010 | Duncan et al. | 711/145 |
| 2010/0153659 A1 * | 6/2010 | Lovell et al. | 711/151 |
| 2010/0165874 A1 | 7/2010 | Brown et al. | |
| 2013/0268728 A1 * | 10/2013 | Ramanujan et al. | 711/105 |

OTHER PUBLICATIONS

U.S. Appl. No. 13/743,795, filed Jan. 13, 2013, entitled "Arbitrating Memory Accesses Via a Shared Memory Fabric", by Daniel F. Cutter.
U.S. Appl. No. 13/248,276, filed Sep. 29, 2011, entitled, "Issuing Requests to a Fabric," by Sridhar Lakshmanamurthy.
International Searching Authority, "Notification of Transmittal of the International Search Report and the Written Opinion of the International Searching Authority," mailed Feb. 28, 2014, in International application No. PCT/US2014/010470.

* cited by examiner

*Primary Examiner* — Idriss N Alrobaye
*Assistant Examiner* — Brooke Taylor
(74) *Attorney, Agent, or Firm* — Trop, Pruner & Hu, P.C.

(57) ABSTRACT

In one embodiment, a fabric of a processor such as a system on a chip includes at least one data buffer including a plurality of entries each to store data to be transferred to and from a plurality of agents and to and from a memory, a request tracker to maintain track of pending requests to be output to an ordered domain of the fabric, and an output throttle logic to control allocation into the ordered domain between write transactions from a core agent and read completion transactions from the memory. Other embodiments are described and claimed.

20 Claims, 6 Drawing Sheets

US 9,075,952 B2

CONTROLLING BANDWIDTH ALLOCATIONS IN A SYSTEM ON A CHIP (SOC)

BACKGROUND

Many computing platforms, particularly portable and other low power devices, incorporate a system on a chip (SoC) as a primary processor. These SoC's are configured to support a platform's programming model to ensure that software functions properly. Some SoC's that follow personal computer (PC)-based standards implement program ordering semantics defined according to a Peripheral Component Interconnect Express (PCI Express™ (PCIe™)) Specification, e.g., as described in the PCI Express™ Specification Base Specification version 2.0 (published Jan. 17, 2007), typically using hardware.

One notable aspect of the ordering architecture is that downstream memory mapped input output (MMIO) writes from a host agent to an input/output (IO) agent travel the same path as read completion data returning to the IO agent from memory. This path is referred to as the outbound path, since it travels away from a root complex of the SoC. Per PCIe™ rules, a memory read completion to the IO agent cannot bypass any prior agent MMIO write that has been posted onto the same virtual channel. Essentially then, the resulting traffic on this outbound path is not controllable, which can lead to starvation and misallocation issues.

DETAILED DESCRIPTION

In various embodiments, a configurable quality of service mechanism may be provided in a SoC system agent for a root complex outbound path. In this way, the bandwidth allocation of downstream MMIO requests from host agents such as caching agents and completions for upstream memory reads from input/output (IO) agents such as non-caching agents may be tuned, while also fulfilling ordering requirements. This mechanism to control the bandwidth allocation is performed prior to entry into an ordered domain of the system agent. Although the scope of the present invention is not limited in this regard, in an embodiment this bandwidth allocation tuning is implemented within a basic input/output system (BIOS).

Figure 1:
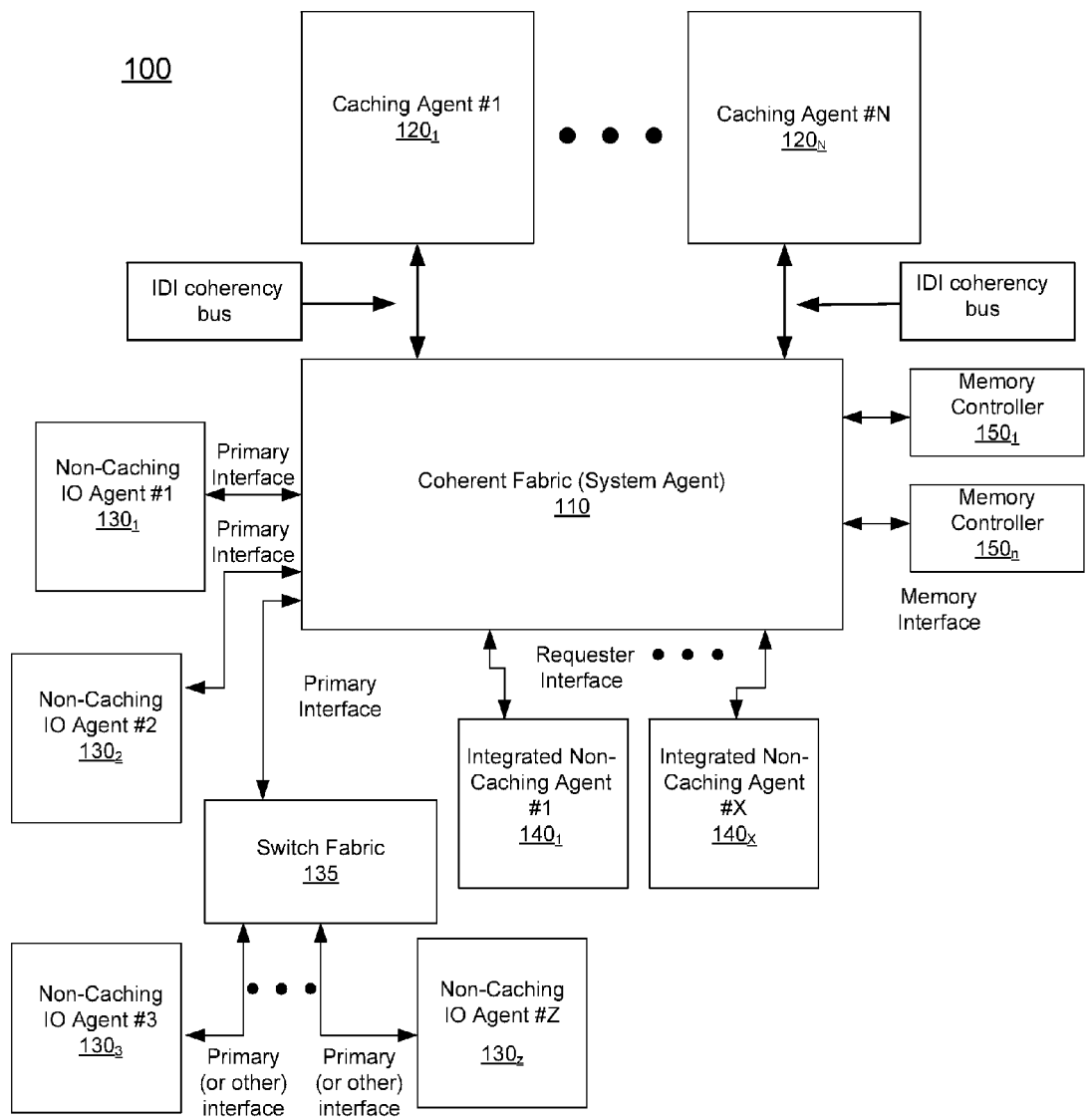
FIG. 1 is a block diagram of a high level view of an SoC in accordance with an embodiment of the present invention.

Referring now to FIG. 1, shown is a block diagram of a high level view of an SoC in accordance with an embodiment of the present invention. As shown in FIG. 1, SoC 100 includes various agents and other components. For purposes of interconnecting the various agents and providing certain system-level control techniques, a coherent fabric 110 is provided, also referred to herein as a system agent. As will be described further below, system agent 110 includes a downstream allocation logic in accordance with an embodiment of the present invention as well as various other components such as queues, buffers, trackers, control logic and so forth.

As seen, coherent fabric 110 acts as a primary on-chip interconnect between a plurality of different agents and other components. On an upstream side, a plurality of caching agents $120_1$-$120_n$ are provided. Although the scope of the present invention is not limited in this regard, these caching agents may correspond to central processing units (CPUs) that generally include one or more processor cores and one or more levels of cache memory. Thus these agents are caching agents in that they are configured to maintain data in a coherent manner via internal agent caches. Although described as CPUs, understand that other types of caching agents such as cores, graphics engines, or other specialized processing logic with associated cache memory may act as caching agents in some embodiments. Also understand that agents that send MMIO writes are not limited to caching agents, and other agents such as non-caching agents also send MMIO transactions.

In contrast, other agents of SoC 100 may be configured as non-caching agents. Different types of non-caching agents may be present such as IO agents which can take many forms such as capture devices, rendering devices, peripheral devices and so forth. Some of these non-caching agents such as non-caching IO agents $130_1$ and $130_2$ are directly coupled to system agent 110 via an on-chip interconnect that complies with PCIe™ ordering rules. The non-caching agents issue upstream snooped and non-snooped memory requests on a primary interface of this on-chip interconnect. IO agents can issue memory requests on any virtual channel (VC) that the SoC supports (note that some SoCs support 1 VC, some support 2 VCs, some support 3 VCs and so forth).

Requests and write data arrive to system agent 110 on an inbound path. Read completion data returns to the agent on the outbound path. Caching agents issue downstream requests to IO devices using port IOs or memory mapped reads/writes. These requests travel on a first virtual channel (namely VC0), in an embodiment. Each request from a caching agent 120 receives an indication from system agent 110 when it is globally ordered. MMIO writes from a caching agent 120 are globally ordered when they pass into an ordered domain of system agent 110. This passing is referred to as posting the downstream write into the outbound path. Once an outbound read completion has crossed into the ordered domain, it cannot bypass any prior MMIO write of the same VC that has been posted into the ordered domain.

In turn, other non-caching IO agents $130_3$-$130_Z$ couple through a switch fabric 135 to the on-chip interconnect primary interface or a bridge to a different protocol. In the example shown, each of these non-caching agents (and the switch fabric) can couple to coherent fabric 110 via a primary interface of the on-chip interconnect. In an embodiment, a primary interface includes one or more VC's, with no ordering requirements between different VC's. In addition, SoC 100 further includes a plurality of integrated non-caching agents $140_1$-$140_X$ that may directly couple to coherent fabric 110 via a requester interface of a different interconnect technology. Still further, a plurality of memory controllers $150_1$-$150_n$ may be also coupled to coherent fabric 110 to provide interconnection and control functionality for a memory (not shown for ease of illustration in FIG. 1) coupled to the SoC which in an embodiment can be implemented as dynamic random access memory (DRAM). Although shown with this example in the embodiment of FIG. 1, understand the scope of the present invention is not limited in this regard and many different types of SoCs and other semiconductor devices can take advantage of a downstream allocation logic in accordance with an embodiment of the present invention.

Figure 2:
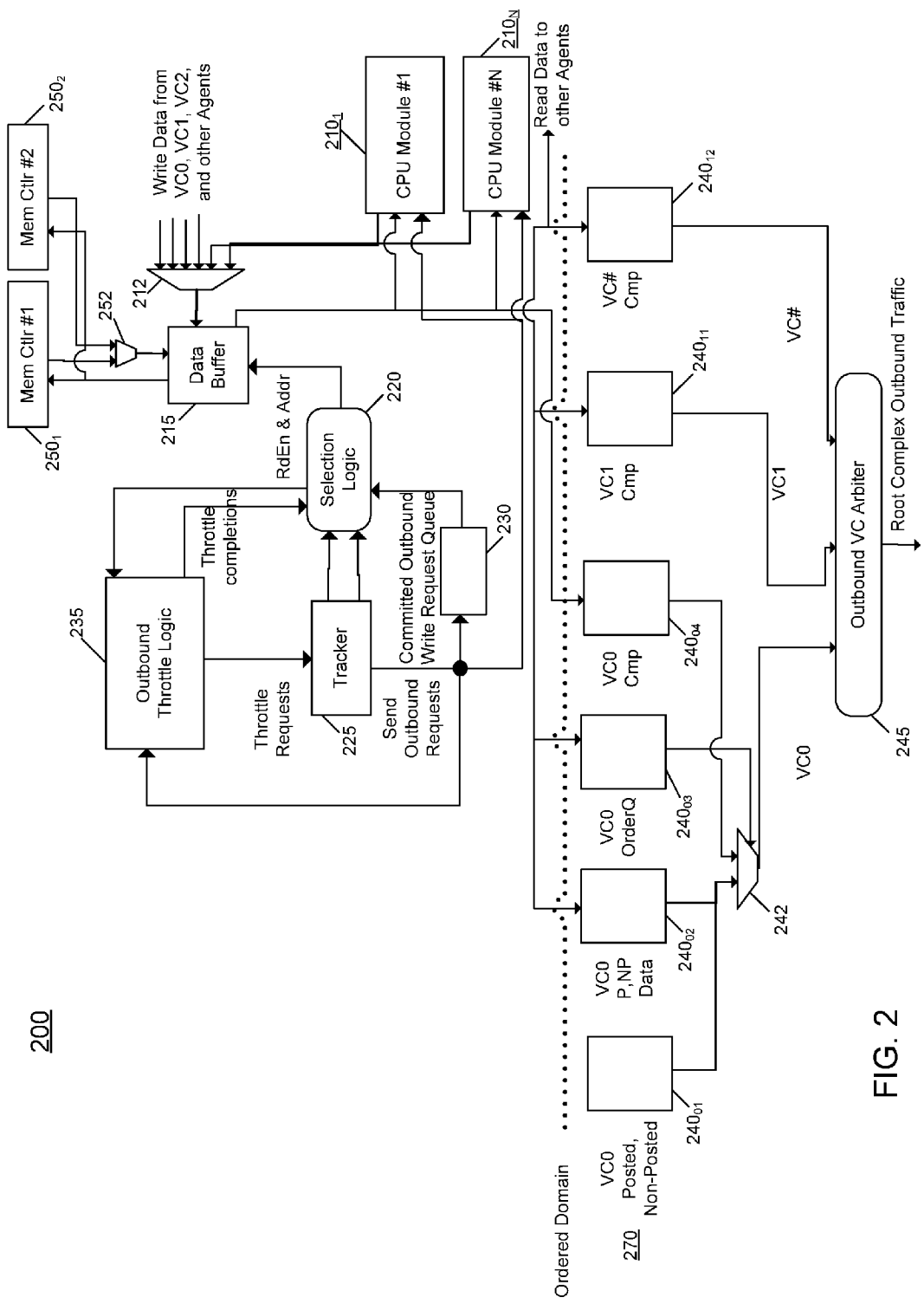
FIG. 2 is a block diagram illustrating details of components of a system agent involved in outbound allocation in accordance with an embodiment of the present invention.

Referring now to FIG. 2, shown is a block diagram illustrating details of components of a system agent involved in outbound allocation in accordance with an embodiment of the present invention. As shown in FIG. 2, system 200 includes various components both within the system agent as well as other components of an SoC.

In the embodiment of FIG. 2, these SoC components include upstream components, namely CPU modules $210_1$-$210_n$ which may generally be configured as described above as to the caching agents of FIG. 1. In addition, a plurality of memory controllers $250_1$ and $250_2$ are present. For purposes of discussion here these memory controllers provide incoming data received from memory that is responsive to upstream read requests. That is, read completion data is provided through these memory controllers, and then passes through a selector 252 and to a data buffer 215 which is a shared buffer into which additional write data from various virtual channels and other agents is provided through another selector 212.

Data buffer 215 may be controlled to output a given portion of data, e.g., an entry in the buffer, responsive to control signals from a selection logic 220 which in an embodiment may provide an address and a read enable signal to thus enable data at a selected address, e.g., stored in a given entry of shared buffer 215, to be output. Shared data buffer 215 stores all data transferred to/from memory, to/from caching agents, and to/from IO agents. Note that in some embodiments separate data buffers may be provided on a dedicated per-memory channel basis. Also separate data buffers may be dedicated per agent or per function (e.g., MMIO write data has a data buffer), or separate data buffers may be provided for each VC.

More specifically as shown in FIG. 2, this data may be output to an appropriate destination such as upstream data to CPUs modules $210_1$-$210_n$ or to another agent. Furthermore, data provided in an outbound direction is output from data buffer 215 and to an appropriate queue within an ordered domain 270, which may be configured with a plurality of output queues $240_{01}$-$240_{12}$. Although shown with this limited number of queues, understand the scope of the present invention is not limited in this regard and more or fewer such queues can be associated with a particular virtual channels and information types may be present in other embodiments.

For purposes of read data to be provided in an outbound direction, the data may be stored in an identified one of these queues. Specifically, read completion data can be stored in one of a number of completion queues $240_{04}$, $240_{11}$ and $240_{12}$, each of which corresponds to a completion queue of a given virtual channel, namely virtual channels VC0-VCN. In addition, data output from data buffer 215 may further be provided to data queue $240_{02}$, which may be configured to store posted and non-posted data for virtual channel 0. As will further be described, information regarding transactions into VC0 including data output from data buffer 215 can also be stored in an order queue $240_{03}$ which is used to indicate ordering of the information present in the other queues of the virtual channel. In addition, a command queue $240_{01}$ may also be associated with posted and non-posted transactions.

Still referring to FIG. 2, a tracker 225 is used to maintain tracking for all outstanding requests. As seen, tracker 225 provides signals to selection logic 220. In addition, an outbound write request queue 230 is coupled between tracker 225 and selection logic 220 and provides an indication when an outbound write request has been committed. When an entry reaches the head of the queue, it is provided to selection logic 220 which in turn sends a control signal to data buffer 215 to cause data associated with the particular outbound write request to be communicated to be output from data buffer 215 for storage in an appropriate queue within the ordered domain.

In operation, an MMIO write request from a caching agent (e.g., CPU module 210) is first loaded into request tracker 225. Then, the MMIO write data is sent from CPU module 210 to the data buffer 215. Tracker 225 also snoops all caching agents to ensure coherency of the MMIO data. The snooping can occur before or after the write data has been sent from CPU module 210. Next, the request is posted to a VC0 posted queue $240_{01}$ (crossing the ordered domain). At this time, CPU module 210 is informed that the request is now ordered, and also a request to access the MMIO write data is loaded into committed outbound write request queue 230. When the request reaches to the head of the queue, the system agent schedules a read from data buffer 215 and transfers the MMIO write data into the VC0 posted data queue $240_{02}$.

Still referring to FIG. 2, an outbound throttle logic 235 may be present and can be used to control communication of outbound posted requests and outbound read completions to thus enable control of bandwidth allocation of posted write transactions such as memory mapped IO (MMIO) write transactions and outbound read completions, prior to their introduction into ordered domain 270. As will be described further below in an embodiment, a multi-state finite state machine may be present within throttle logic 235 to controllably share a bandwidth between these outbound write transactions and read completion transactions in accordance with an embodiment of the present invention.

Figure 3:
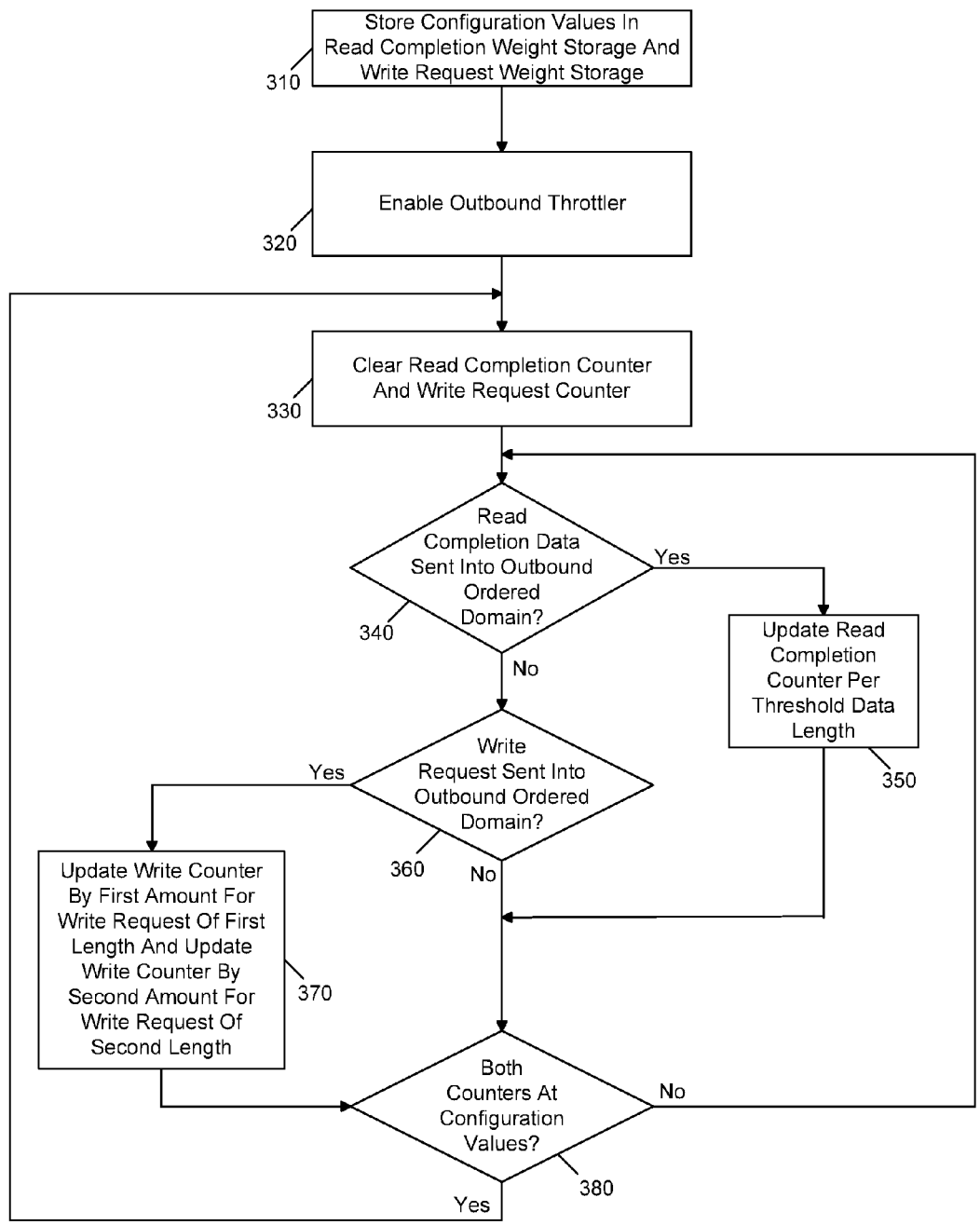
FIG. 3 is a flow diagram of a method for controlling bandwidth of an outbound channel having different types of information flow in accordance with an embodiment of the present invention.

Referring now to FIG. 3, shown is a flow diagram of a method for controlling bandwidth of an outbound channel having different types of information flow in accordance with an embodiment of the present invention. Note that the operation described in FIG. 3 is with regard to a single channel that is shared between multiple information types. In the particular embodiment described herein this may be a virtual channel zero (VC0) that includes multiple output queues to store various information types for passing into a communication channel. As an example, these queues can include a posted/non-posted command queue, a write completion queue, a posted/non-posted data queue and an order queue, as discussed above. Of course, each of multiple channels may update in accordance with method 300, or multiple channels may have their bandwidth allocated in this manner.

As shown in FIG. 3, method 300 may be performed, e.g., by outbound throttle logic of a system agent or other fabric. As seen, method 300 begins by storing configuration values in certain configuration storages. Specifically, a read configuration weight storage and a write request weight storage may be present within the logic and can be implemented, e.g., by registers that store these weight values which may be configured and stored in these storages by BIOS. In an embodiment, these weight values may correspond to a maximum number of a given type of transaction that can be sent in an outbound direction, e.g., to an outbound ordered domain consecutively prior to enabling another type of information flow to the outbound ordered domain.

Still referring to FIG. 3, next control passes to block 320 where the outbound throttle is enabled (block 310). For example, the throttler may be enabled on reset responsive to control by BIOS, firmware, or a driver that configures the throttler for activity during normal operation. In other embodiments this enabling of the throttler may be on a dynamic basis that is controlled, e.g., based on workload and/or user control. In an embodiment, the outbound throttle logic may include a configuration storage having an enable field to indicate whether the logic is to be enabled or disabled. Control next passes to block 330 where various counters are cleared. These counters include a read completion counter and a write request counter. In an embodiment, these counters may be configured to be incrementing counters that are incremented each time a threshold amount of information of the corresponding transaction type is set into the outbound ordered domain.

At this point, the outbound throttle logic is ready for normal operation. As seen, control passes to diamond 340 where it can be determined whether read completion data has been sent into the outbound ordered domain. If so, control passes back to block 350 where the read completion counter can be updated per threshold data length communicated. As an example, the counter can be incremented by one for each 64 byte (B) chunk of data sent into the outbound ordered domain. Of course understand the scope of the present invention is not limited in this regard and in other embodiments, different configurable amounts of data cause an incrementing of the counter.

If instead at diamond 340 it is determined that completion data is not sent into the outbound ordered domain, control next passes to diamond 360 where it can be determined whether a write request has been sent into the outbound ordered domain. If so, control passes to block 370 where the write request counter is updated based on the size of the write request. That is, if the write request is less than a first length, a first amount of update occurs and if the write request is greater than this length, a second amount of update occurs.

From any of the above paths, control passes to diamond 380 where it can be determined whether both counters are at their configuration values. That is, both of the counters may be configured as saturation counters such that when the configuration value is reached, the counter does not reset or roll over, it simply remains at the saturated value. Thus when both counters are at their saturated values, control passes to block 330 where these counters can be reset and operation continues. If both counters are not at their configuration value, control passes instead back to diamond 340 for further operation. Although discussed at this high level in the embodiment of FIG. 3, understand the scope of present invention is not limited in this regard.

Figure 4:
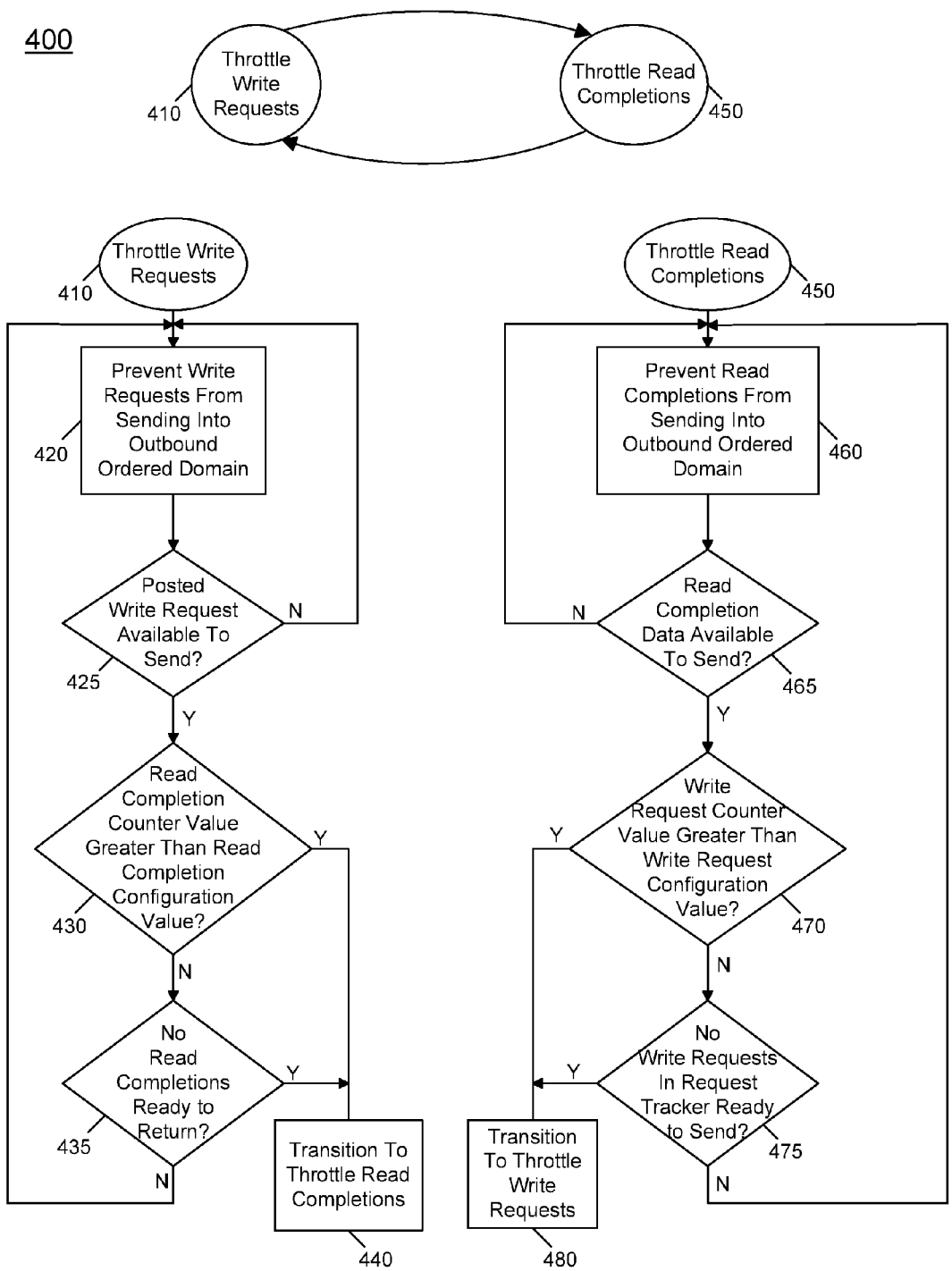
FIG. 4 is a block diagram of a state machine for performing outbound bandwidth throttling in accordance with an embodiment of the present invention.

Referring now to FIG. 4, shown is a block diagram of a state machine for performing outbound bandwidth throttling in accordance with an embodiment of the present invention. As shown in FIG. 4, a state machine 400 includes a first state 410, namely a throttle write requests state and a second state 450, namely a throttle read completions state. As operation of a system proceeds, based on certain conditions the states transition from one to the other.

As to first state machine 410 its operation begins at block 420 where it prevents write requests from being sent into the outbound ordered domain. Although the scope of the present invention is not limited in this regard, in an embodiment a throttle signal can be sent from an outbound throttler logic to a tracker that controls the output of write requests into the outbound ordered domain. Next control passes to diamond 425 where it can be determined whether there are posted write requests available to send. Although the scope of the present invention is not limited in this regard, this determination can be based on information in the tracker, such as analysis of a message type field of each of the entries of the tracker.

If it is determined that there are posted writes available to send, control next passes to diamond 430 where it can be determined whether the read completion counter value is greater than the configuration value for the counter. In other words it can be determined whether the read completion counter has saturated. If not, control next passes to diamond 435 where it can be determined whether there are no read completions that are ready to return into the outbound ordered domain. If there are no such read completions available, control passes to block 440 where the state machine may transition to the other state, namely the throttle read completions state. Note that control also passes to block 440 if the read completion counter value is greater than the read completion configuration value.

As to second state machine 450 its operation begins at block 460 where it prevents read completions from being sent into the outbound ordered domain. Although the scope of the present invention is not limited in this regard, in an embodiment a throttle signal can be sent from the outbound throttler logic to a selection logic that in turn controls the output of read completions into the outbound ordered domain from a shared data buffer. Next, control passes to diamond 465 where it can be determined whether there are read completions available to send. Although the scope of the present invention is not limited in this regard, this determination can be based on information in the shared data buffer, such as analysis of a valid field of each of the entries of the buffer.

If it is determined that there are read completions available to send, control next passes to diamond 470 where it can be determined whether the write request counter value is greater than the configuration value for the counter. In other words it can be determined whether the write request counter has saturated. If not, control next passes to diamond 475 where it can be determined whether there are no write requests present in the request tracker that are ready to be sent into the outbound ordered domain. If there are no such write requests available, control passes to block 480 where the state machine may transition to the other state, namely the throttle write requests state. Note that control also passes to block 480 if the write request counter value is greater than the write request configuration value.

Figure 5:
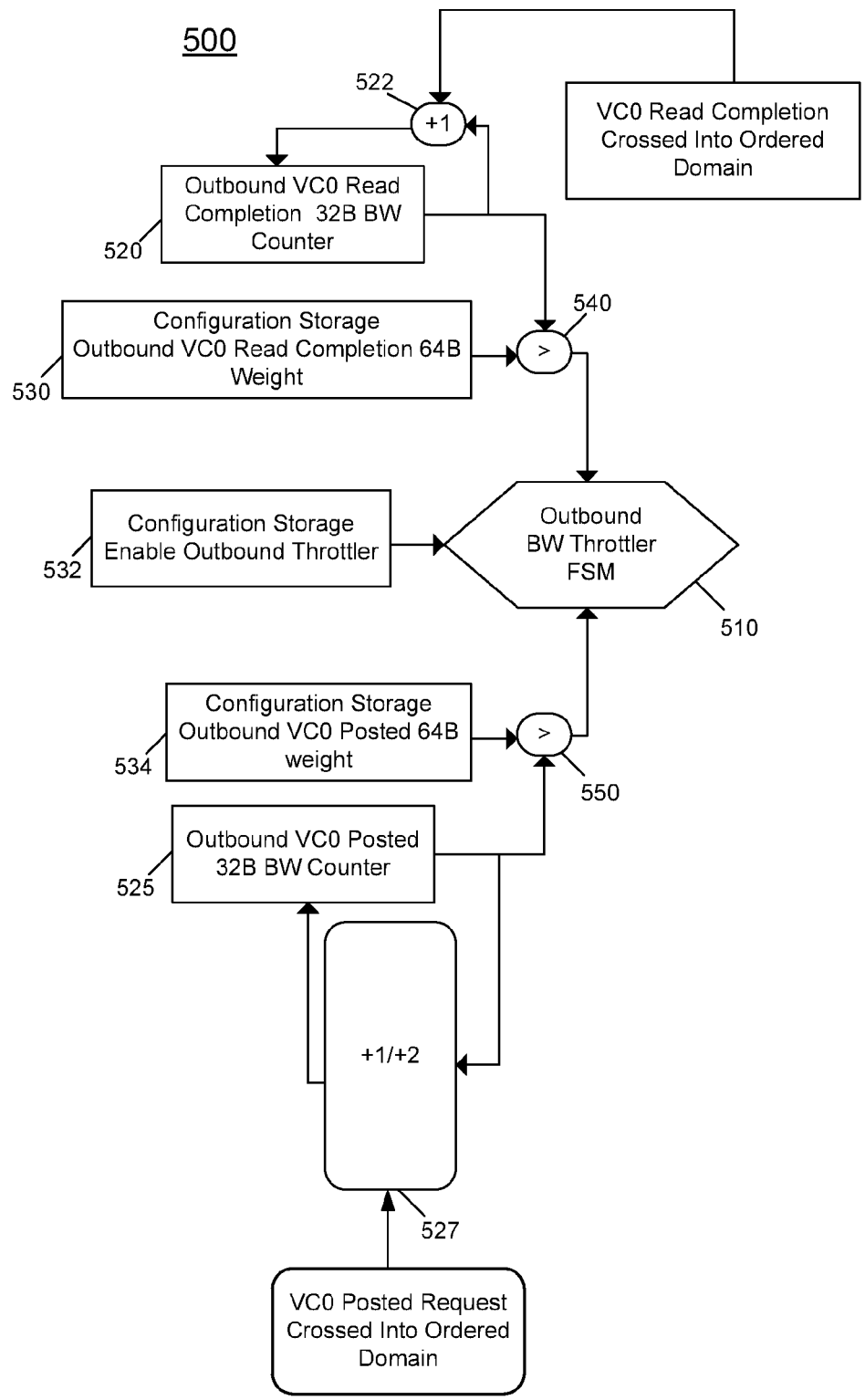
FIG. 5 is a block diagram of an outbound throttle logic in accordance with an embodiment of the present invention.

Referring now to FIG. 5, shown is a block diagram of an outbound throttle logic 500 in accordance with an embodiment of the present invention. As shown in FIG. 5, an outbound state machine 510 may be implemented as microcode, programmable logic, hard-coded logic, control logic, a processor abstraction layer or so forth. It may generally perform the operations described with regard to the different states discussed in FIG. 4. To control bandwidth allocation, BIOS configures 3 states that may be stored in configuration registers, in an embodiment, namely an enable outbound throttler storage 532; an outbound VC0 read completion weight storage 530, the value of which indicates the number of 64 B transfers allowed before throttling VC0 read completions, and an outbound VC0 posted MMIO weight storage 534, the value of which indicates the number of 64B transfers allowed before throttling VC0 posted MMIO writes.

As seen, state machine 510 receives inputs indicating that a given type of transaction traffic has reached its weight or configuration level. Specifically, from a first comparator 540, an indication is received when the number of read completions sent to an ordered domain exceeds a configuration level. As such, comparator 540 compares a configuration value stored in configuration storage 530 to a value from a read completion counter 520 which as seen is incremented (e.g., by 1) via a logic block 522 when a given read completion transaction has crossed into the ordered domain (which in an embodiment can be indicated by a signal provided from selection logic of the fabric).

And, state machine 510 receives an indication from a second comparator 550 when the number of posted transactions sent to an ordered domain exceeds a configuration level. As such, comparator 550 compares a configuration value stored in configuration storage 534 to a value from a posted transaction counter 525 which as seen is incremented (e.g., by 1 or 2) via a logic block 527 when a given posted transaction has crossed into the ordered domain (which in an embodiment can be indicated by a signal provided from selection logic of the fabric).

Thus read completion counter 520, which may clear at reset, increments by 1 every time 1-32 B have been transferred from the data buffer into the outbound ordered domain. This counter may saturate at the maximum value of the counter (and does not wrap). Write counter 525, which may clear at reset, increments by 1 every time a write request of length 1-32 B has been transferred from the request tracker into the outbound ordered domain, and increments by 2 every time a write request of length 33-64 B has been transferred from the request tracker into the outbound ordered domain. This counter may saturate at the maximum value of the counter (and does not wrap). When both counters reach their configured weight, they are both cleared.

In an embodiment, state machine 500 resets into State0, namely the throttle outbound posted MMIO requests state. In this state, the request tracker stops sending any posted MMIO writes into the outbound path ordered domain. A transition to State1 occurs if: there is a downstream posted MMIO request available to send to the ordered domain, and either of two conditions occurs: (1) number of bytes in the read completion counter is greater than the configured outbound read completion weight; or (2) there are no read data completions in the data buffer ready to return on the VC0 outbound path.

In State1, namely the throttle outbound memory read completions state, the system agent stops scheduling read data returns from the data buffer to the outbound path ordered domain. A transition to State0 occurs if: there is read completion data in the data buffer ready to return on the outbound path and either of two conditions occurs: (1) number of bytes in the posted MMIO write BW completion counter is greater than the configured outbound posted MMIO weight; or (2) there are no posted MMIO writes in the request tracker ready to send to the outbound ordered domain. Note that read completions to other VC's other than VC0 are not throttled in the unordered domain, as there is a separate arbiter in the ordered domain that allocates traffic bandwidth across VC's.

Using an embodiment of the present invention, BIOS or other system software can dynamically tune outbound traffic characteristics, without requiring a re-spin of the silicon. With an embodiment of the present invention, an SoC can implement different intellectual property (IP) logic blocks controlled by many different drivers. And further, an embodiment can prevent a driver that may oversubscribe MMIO bandwidth to a device which in turn may affect memory read bandwidth and/or latency for another device such an USB3 host controller from causing user visible quality errors. As such, traffic patterns can be fine-tuned without rewriting drivers. Still further embodiments may provide resilience against a bad device driver which maliciously tries to use excessive bandwidth. For example, a device driver which tries to oversubscribe outbound traffic to MMIO posted writes can have its bandwidth limited as described herein.

Figure 6:
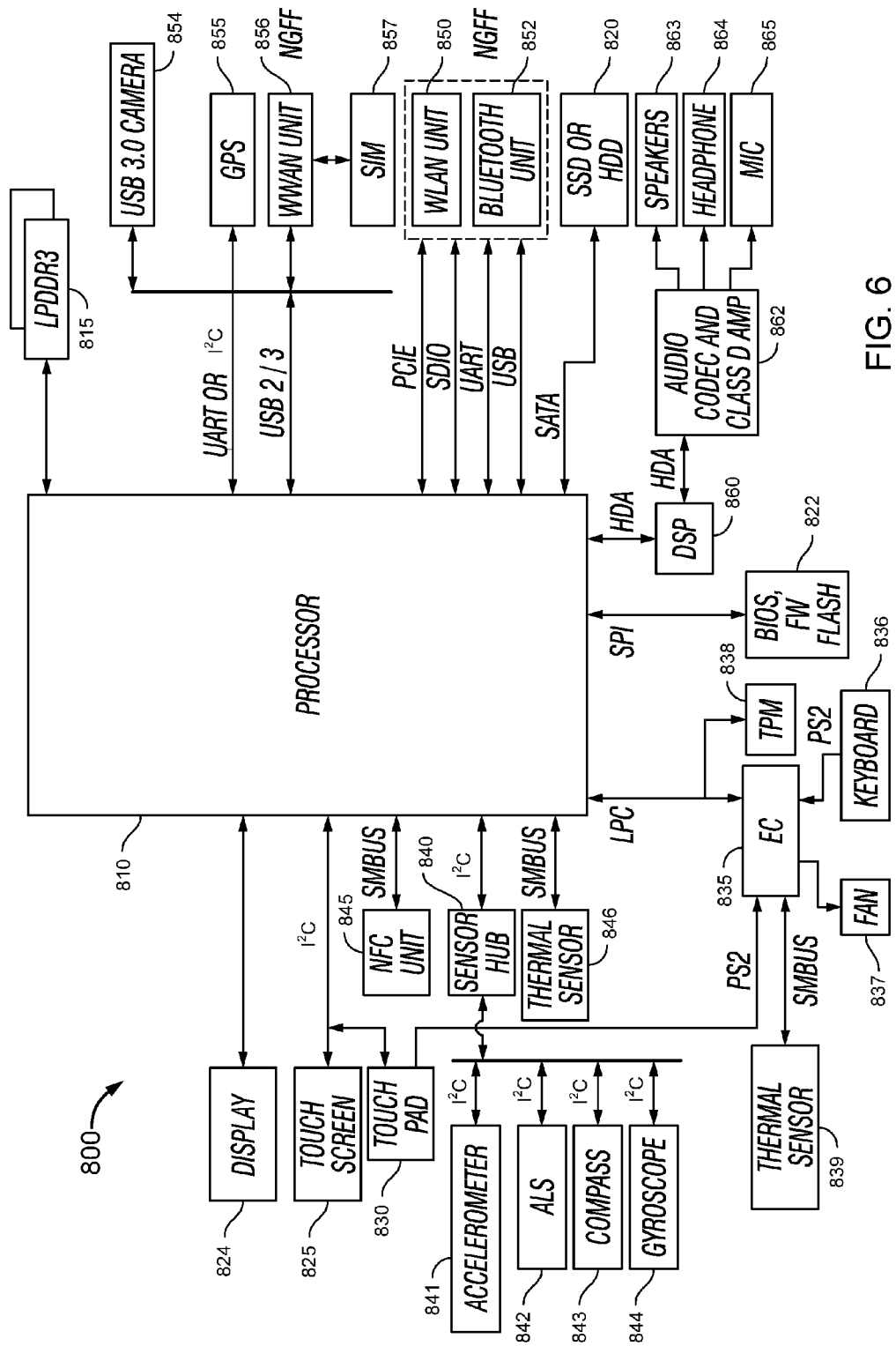
FIG. 6 is a block diagram of components present in a computer system in accordance with an embodiment of the present invention.

Referring now to FIG. 6, shown is a block diagram of components present in a computer system in accordance with an embodiment of the present invention. As shown in FIG. 6, system 800 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 6 is intended to show a high level view of many components of the computer system. However, it is to be understood that additional components may be present in certain implementations and furthermore, different arrangement of the components shown may occur in other implementations.

As seen in FIG. 6, a processor 810, which may be a low power multicore processor socket such as an ultra low voltage processor, may act as a main processing unit and central hub for communication with the various components of the system. Such processor can be implemented as a SoC as described herein. In one embodiment, processor 810 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 6, a flash device 822 may be coupled to processor 810, e.g., via a serial peripheral interface (SPI). This flash device may provide for non-volatile storage of system software, including a basic input/output software (BIOS) as well as other firmware of the system.

Various input/output (IO) devices may be present within system 800. Specifically shown in the embodiment of FIG. 6 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I²C interconnect. As further shown in FIG. 6, in addition to touch screen 825, user input by way of touch can also occur via a touch pad 830 which may be configured within the chassis and may also be coupled to the same I²C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I2C interconnect. In the embodiment shown in FIG. 6, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment.

Also seen in FIG. 6, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect.

System 800 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 6, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 6, WWAN unit 856 and an integrated capture device such as a camera module 854 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864. Although shown with these particular components in the embodiment of FIG. 6, understand the scope of the present invention is not limited in this regard.

The following examples pertain to further embodiments. In an embodiment, a SoC includes a fabric to interconnect a plurality of agents of the SoC. This fabric includes: at least one data buffer including a plurality of entries each to store data to be transferred to and from the plurality of agents, and to and from a memory coupled to the SoC; a request tracker to maintain track of pending requests to be output to an ordered domain of the fabric; and an output throttle logic to control allocation into the ordered domain between write transactions from a core agent and read completion transactions from the memory.

In an embodiment, the outbound throttle logic includes a first counter to communicate a first count and a second counter to communicate a second count. The first counter is configurable to saturate at a write transaction configuration value, and the second counter is configurable to saturate at a read completion transaction configuration value. A first configuration storage may store the write transaction configuration value, and a second storage may store the read completion transaction configuration value. These storages may be written by a BIOS, a firmware, or a driver. The first counter is to be updated when a write transaction is allocated into the ordered domain and the second counter is to be updated when a read completion transaction is allocated into the ordered domain. Also, the first counter is to be updated by a first amount when the write transaction is less than a first threshold and by a second amount when the write transaction is greater than the first threshold.

In an embodiment, the outbound throttle logic includes a state machine having a first state to prevent the write transactions from being allocated into the ordered domain, and a second state to prevent the read completion transactions from being allocated into the ordered domain.

The outbound throttle logic may further include: a first comparator to compare the first count to the write transaction configuration value and to output a first comparison signal indicative of the comparison to the state machine; and a second comparator to compare the second count to the read completion transaction configuration value and to output a second comparison signal indicative of the comparison to the state machine, where the state machine is to transition from the first state to the second state based at least in part on the second comparison signal.

In an embodiment, the fabric further includes a write request queue coupled to the request tracker to store a plurality of entries each corresponding to a write transaction, and a selection logic coupled to the request tracker, the outbound throttle logic, and the write request queue, where the selection logic is to select an entry of the at least one data buffer to output to the ordered domain.

The ordered domain includes a plurality of channels, where a first channel includes a plurality of queues including a request queue, a data queue, a read completion queue, and an order queue to identify an order of receipt of information into each of the request queue, the data queue, and the read completion queue. A first arbiter may be coupled to the first channel to arbitrate between the request queue, the data queue and the read completion queue based on the information in the order queue. And, a second arbiter may be coupled to the first arbiter and others of the channels to arbitrate and select a transaction for output from the fabric.

In another embodiment, a method includes: enabling an outbound throttler of a system agent of an SoC, where the system agent interconnects a plurality of agents of the SoC including at least one host agent and at least one IO agent; storing a first configuration value in a read completion weight storage and storing a second configuration value in a write request weight storage, where these configuration values are stored during SoC initialization; and throttling one of write requests and read completions from being sent into an ordered domain of the system agent based at least in part on a counter value associated with the other of the write requests and the read completions.

In an embodiment, the method further includes updating a read completion counter per threshold data length responsive to read completion data of a read completion being sent into the ordered domain, and updating a write counter by a first amount responsive to a write request of a first length being sent into the ordered domain and updating the write counter by a second amount responsive to a write request of a second length being sent into the ordered domain.

The method may further throttle the write requests responsive to read completion data being ready to be sent to the ordered domain and a counter value of the write counter being greater than the second configuration value.

The method may further throttle the read requests responsive to at least one write request being ready to be sent to the ordered domain and a counter value of the read completion counter being greater than the first configuration value.

Note that the throttling may include allocating a bandwidth into a first channel of the ordered domain, where the bandwidth is allocated according to the first and second configuration values.

In another embodiment, a system includes a SoC having a first core and a first cache memory, a second core and a second cache memory, and a memory controller to couple to a DRAM. The SoC further includes multiple non-caching agents, and a fabric to couple the cores, the non-caching agents and the memory controller, where the fabric includes an ordered domain and an unordered domain, and further includes an output throttle logic to control allocation into the ordered domain between write transactions from the cores and read completion transactions from the non-caching agents.

In an embodiment, the outbound throttle logic includes: a first counter to communicate a first count, where this counter is configurable to saturate at a write transaction configuration value; and a second counter to communicate a second count, where this counter is configurable to saturate at a read completion transaction configuration value. Note that these configuration values are set during initialization of the SoC. A bandwidth of a downstream channel coupled to the fabric is allocated between the write and read completion transactions based at least in part on the configuration values. This bandwidth is tunable according to a BIOS, a firmware or a driver.

In another example, a communication device may be arranged to perform any of the methods described herein.

As a further example, at least one machine readable medium comprises a plurality of instructions that in response to being executed on a computing device, cause the computing device to carry out any of the methods described herein.

An apparatus for processing instructions may be configured to perform the method of any of the methods described herein. And an apparatus may further include means for performing any of the methods described herein.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system on a chip (SoC) comprising:
a fabric to interconnect a plurality of agents of the SoC, the fabric comprising:
at least one data buffer including a plurality of entries each to store data to be transferred to and from the plurality of agents, and to and from a memory coupled to the SoC;
a request tracker to maintain track of pending requests to be output to an ordered domain of the fabric, the ordered domain to couple to a plurality of downstream agents of the SoC and in which a read completion transaction of a channel is to be prevented from passing a write transaction of the channel, wherein the ordered domain includes a plurality of channels, wherein a first channel of the plurality of channels includes a plurality of queues including a request queue, a data queue, a read completion queue, and an order queue to identify an order of receipt of information into each of the request queue, the data queue, and the read completion queue; and
an outbound throttle logic to control bandwidth allocation prior to introduction into the ordered domain between write transactions from a core agent of the plurality of agents directed to one of the plurality of downstream agents and read completion transactions from the memory directed to one of the plurality of downstream agents, wherein the outbound throttle logic is to be dynamically enabled based on a workload.

2. The SoC of claim 1, wherein the outbound throttle logic comprises:
a first counter to communicate a first count, wherein the first counter is configurable to saturate at a write transaction configuration value; and
a second counter to communicate a second count, wherein the second counter is configurable to saturate at a read completion transaction configuration value.

3. The SoC of claim 2, further comprising: a first configuration storage to store the write transaction configuration value; and a second storage to store the read completion transaction configuration value, the first and second storages to be written by a basic input/output system (BIOS), a firmware, or a driver.

4. The SoC of claim 3, wherein the first counter is to be updated when a write transaction is allocated into the ordered domain and the second counter is to be updated when a read completion transaction is allocated into the ordered domain.

5. The SoC of claim 4, wherein the first counter is to be updated by a first amount when the write transaction is less than a first threshold and by a second amount when the write transaction is greater than the first threshold.

6. The SoC of claim 2, wherein the outbound throttle logic further comprises a state machine including:
a first state to prevent the write transactions from being allocated into the ordered domain; and
a second state to prevent the read completion transactions from being allocated into the ordered domain.

7. The SoC of claim 6, wherein the outbound throttle logic further comprises:
a first comparator to compare the first count to the write transaction configuration value and to output a first comparison signal indicative of the comparison to the state machine; and
a second comparator to compare the second count to the read completion transaction configuration value and to output a second comparison signal indicative of the comparison to the state machine, wherein the state machine is to transition from the first state to the second state based at least in part on the second comparison signal.

8. The SoC of claim 1, wherein the fabric further comprises:
a write request queue coupled to the request tracker to store a plurality of entries each corresponding to a write transaction; and
a selection logic coupled to the request tracker, the outbound throttle logic, and the write request queue, wherein the selection logic is to select an entry of the at least one data buffer to output to the ordered domain.

9. The SoC of claim 1, further comprising a first arbiter coupled to the first channel to arbitrate between the request queue, the data queue and the read completion queue based on the information in the order queue.

10. The SoC of claim 9, further comprising a second arbiter coupled to the first arbiter and others of the plurality of channels to arbitrate and select a transaction for output from the fabric.

11. A method comprising:
enabling an outbound throttler of a system agent of a system on a chip (SoC) dynamically based on a workload, the system agent interconnecting a plurality of agents of the SoC including at least one host agent and at least one input/output (TO) agent;
storing a first configuration value in a read completion weight storage and storing a second configuration value in a write request weight storage, the first and second configuration values stored during initialization of the SoC;
and throttling one of write requests and read completions, prior to introduction into an ordered domain of the system agent from being sent into the ordered domain of the system agent based at least in part on a counter value associated with the other of the write requests and the read completions, the ordered domain to couple to a plurality of downstream agents of the SoC and in which a read completion transaction of a channel is to be prevented from passing a write transaction of the channel.

12. The method of claim 11, further comprising updating a read completion counter per threshold data length responsive to read completion data of a read completion being sent into the ordered domain.

13. The method of claim 12, further comprising updating a write counter by a first amount responsive to a write request of a first length being sent into the ordered domain and updating the write counter by a second amount responsive to a write request of a second length being sent into the ordered domain.

14. The method of claim 11, further comprising throttling the write requests responsive to:
read completion data being ready to be sent to the ordered domain;
and a counter value of the write counter being greater than the second configuration value.

15. The method of claim 11, further comprising throttling the read completions responsive to:
at least one write request being ready to be sent to the ordered domain;
and a counter value of the read completion counter being greater than the first configuration value.

16. The method of claim 11, wherein throttling the one of the write requests and the read completions comprises allocating a bandwidth into a first channel of the ordered domain, the bandwidth allocated according to the first and second configuration values.

17. A system comprising:
a system on a chip (SoC) including:
a first core and a first cache memory;
a second core and a second cache memory;
at least one memory controller to couple to a dynamic random access memory (DRAM);
a first non-caching agent;
a second non-caching agent;
a fabric to couple the first and second cores, the first and second non-caching agents and the at least one memory controller, the fabric comprising an ordered domain and an unordered domain, the ordered domain to couple to the first and second non-caching agents and in which a read completion transaction of a channel is to be prevented from passing a write transaction of the channel, wherein the channel includes a plurality of queues including a request queue, a data queue, a read completion queue, and an order queue to identify an order of receipt of information into each of the request queue, the data queue, and the read completion queue,
and further including:
an outbound throttle logic to control bandwidth allocation prior to introduction into the ordered domain between write transactions from the first and second cores directed to one of the first and second non-caching agents and read completion transactions directed to one of the first and second non-caching agents, wherein the outbound throttle logic is to be dynamically enabled based on a workload;
and the DRAM coupled to the SoC.

18. The system of claim 17, wherein the outbound throttle logic comprises:
a first counter to communicate a first count, wherein the first counter is configurable to saturate at a write transaction configuration value; and
a second counter to communicate a second count, wherein the second counter is configurable to saturate at a read completion transaction configuration value, wherein the write transaction configuration value and the read completion transaction configuration value are set during initialization of the SoC.

19. The system of claim 18, wherein a bandwidth of a downstream channel coupled to the fabric is allocated between the write transactions and the read completion transactions based at least in part on the write transaction configuration value and the read completion transaction configuration value.

20. The system of claim 19, wherein the bandwidth is tunable according to a basic input/output system (BIOS), a firmware or a driver.

* * * * *